US012194760B2

(12) United States Patent
Ando

(10) Patent No.: US 12,194,760 B2
(45) Date of Patent: Jan. 14, 2025

(54) PRINTER

(71) Applicant: Toshiba Tec Kabushiki Kaisha, Tokyo (JP)

(72) Inventor: Koichi Ando, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 171 days.

(21) Appl. No.: 18/162,684

(22) Filed: Jan. 31, 2023

(65) Prior Publication Data

US 2023/0398787 A1 Dec. 14, 2023

(30) Foreign Application Priority Data

May 24, 2022 (JP) ................................ 2022-084835

(51) Int. Cl.
*B41J 2/325* (2006.01)
*B41J 33/26* (2006.01)

(52) U.S. Cl.
CPC ............... *B41J 2/325* (2013.01); *B41J 33/26* (2013.01); *B41J 2202/31* (2013.01)

(58) Field of Classification Search
CPC ......... B41J 2/325; B41J 33/26; B41J 2202/31
See application file for complete search history.

(56) References Cited

FOREIGN PATENT DOCUMENTS

| | | | | |
|---|---|---|---|---|
| EP | 3424736 B1 * | 8/2021 | ............. | B41J 2/325 |
| JP | 2003-251873 A | 9/2003 | | |

OTHER PUBLICATIONS

Asai Yoshinori, Printer, Jan. 9, 2019, {Paragraphs 0027, 0033-0035] (Year: 2019).*

* cited by examiner

*Primary Examiner* — Lisa Solomon
(74) *Attorney, Agent, or Firm* — Kim & Stewart LLP

(57) ABSTRACT

A printer includes a housing, a shaft connected to an inner surface of the housing at a first end thereof, extending along a first direction to a second end, and by which an ink ribbon is held, a print head connected to the surface at a first end thereof, extending along the direction to a second end, and transferring ink from the ribbon to a sheet, a roller connected to the surface at a first end thereof, extending along the direction to a second end, and conveying the sheet, and a holding plate connected to the second end of the roller and rotatable around a first hinge and by which the second ends of the shaft and the head are held when the plate is rotated about the first hinge to be parallel to the surface. The plate includes a second hinge about which the holding plate is foldable.

20 Claims, 11 Drawing Sheets

PRINTER

CROSS-REFERENCE TO RELATED APPLICATION(S)

This application is based upon and claims the benefit of priority from Japanese Patent Application No. 2022-084835, filed May 24, 2022, the entire contents of which are incorporated herein by reference.

FIELD

Embodiments described herein relate generally to a printer.

BACKGROUND

Conventionally, there is a thermal transfer type printer that performs printing using an ink ribbon. In such a printer, an ink ribbon shaft and a print head unit supported inside the housing have a cantilever structure, i.e., one end thereof is not connected to the housing, so that the ink ribbon can be replaced from that end when the cover of the housing is opened.

In a printer having such a cantilever structure, there is a possibility that inclination occurs in the ink ribbon shaft or a gap between the print head unit and the platen roller unit changes due to various factors. Therefore, conventionally, a positioning plate (hereinafter also referred to as a holding side plate), which is formed of one plate-like member having a lower end fixed to the housing with a hinge, is used to switch between a closed state in which the free ends of the ink ribbon shaft and the print head unit are supported and an open state in which those free ends are not supported.

However, in the above-described conventional configuration, since the holding side plate rotates to open with respect to the hinge as a fulcrum, the holding side plate protrudes beyond the body width of the printer when the free end is opened, such as when the ink ribbon is replaced, and thus an extra space is necessary for performing some maintenance operations inside the printer.

SUMMARY OF THE INVENTION

Embodiments of the present invention provide a printer that occupies a less space when its cover is opened.

A printer includes a housing, an ink ribbon shaft connected to an inner surface of the housing at a first end of the ink ribbon shaft, extending along a first direction away from the inner surface of the housing from the first end to a second end, and by which an ink ribbon is held, a print head connected to the inner surface of the housing at a first end of the print head, extending along the first direction from the first end to a second end, and configured to transfer ink from the ink ribbon to a sheet, a platen roller connected to the inner surface of the housing at a first end of the platen roller, extending along the first direction from the first end to a second end, and facing the print head to convey the sheet, and a holding plate connected to the second end of the platen roller to be rotatable around a first hinge, and by which the second end of each of the ink ribbon shaft and the print head is held when the holding plate is rotated about the first hinge to be parallel to the inner surface of the housing. The holding plate includes a second hinge about which the holding plate is foldable.

DETAILED DESCRIPTION

Hereinafter, embodiments will be described in detail with reference to the drawings. The present invention is not limited to the embodiments described below.

Figure 1:
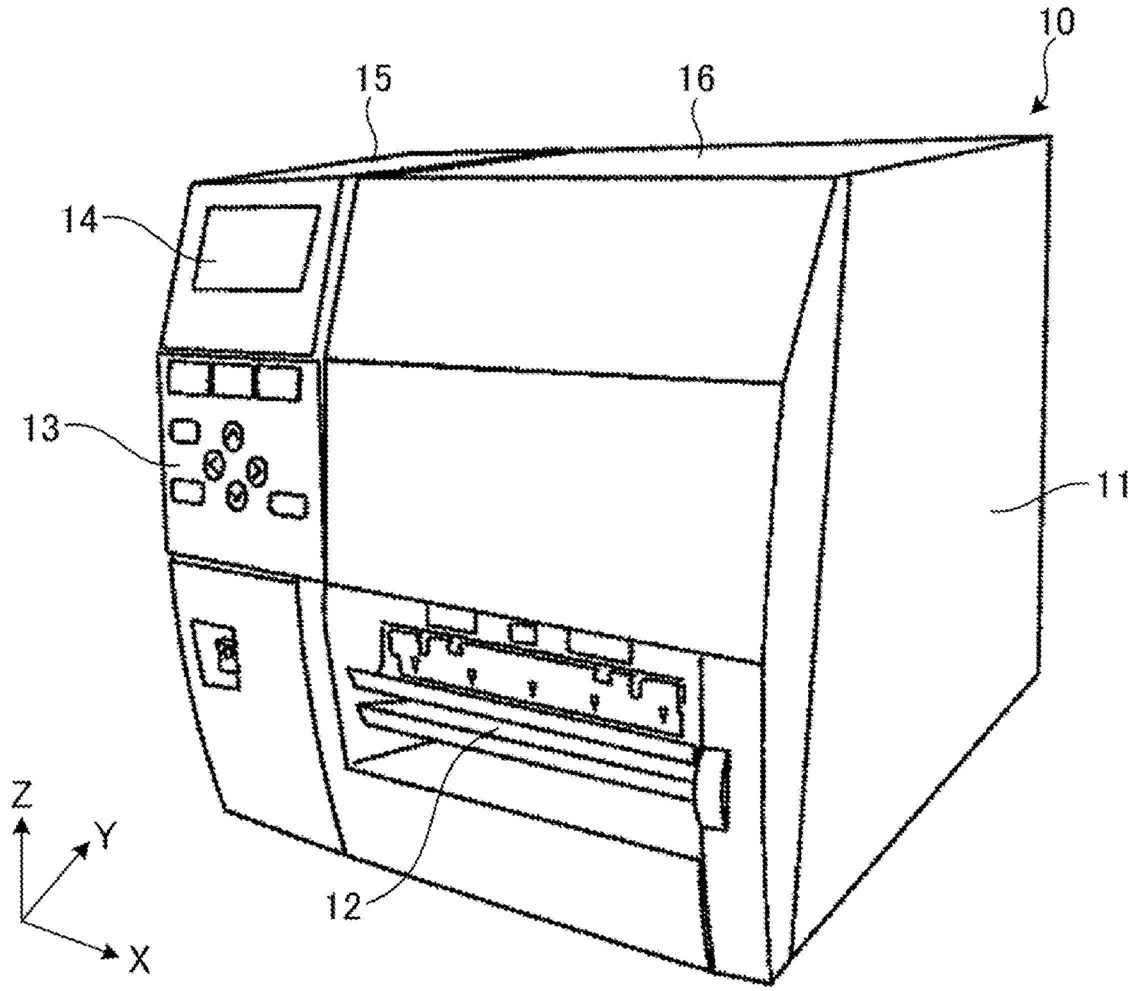
FIG. 1 is a perspective view schematically illustrating an external appearance of a printer according to an embodiment.
Figure 2:
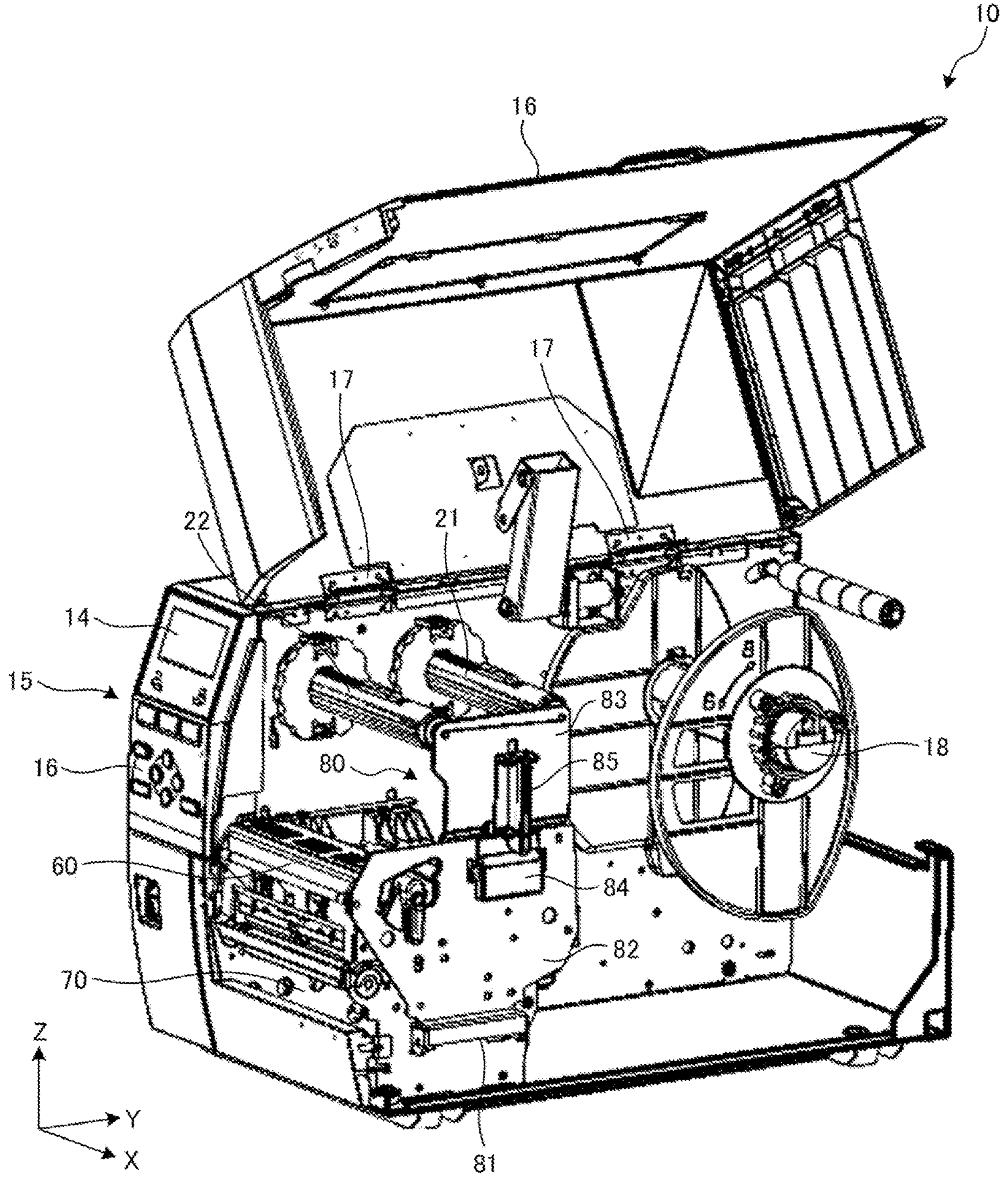
FIG. 2 is a perspective view schematically illustrating the printer in which a cover thereof is opened.
Figure 3:
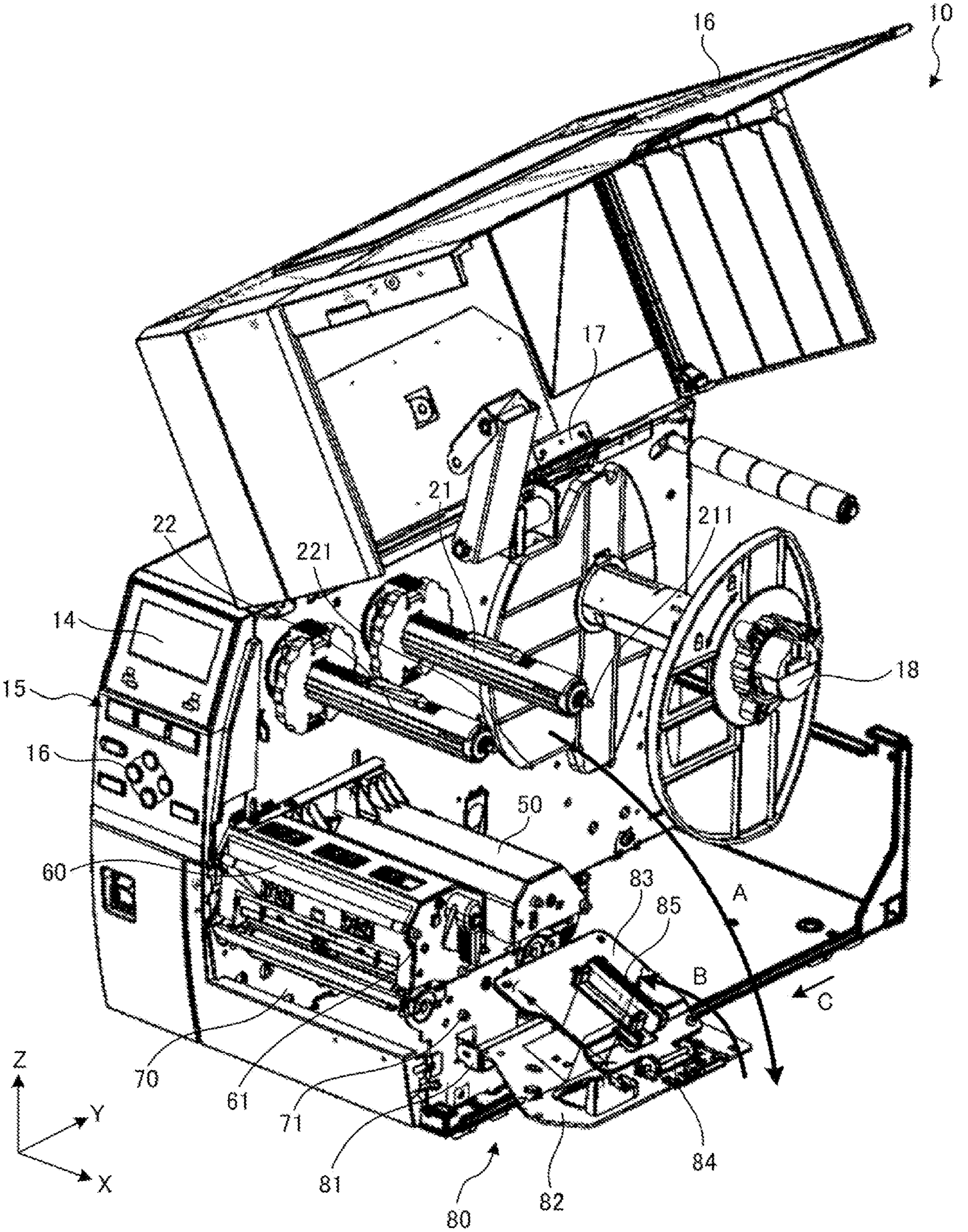
FIG. 3 is a perspective view schematically illustrating the printer in which the cover and a holding side plate are opened.
Figure 4:
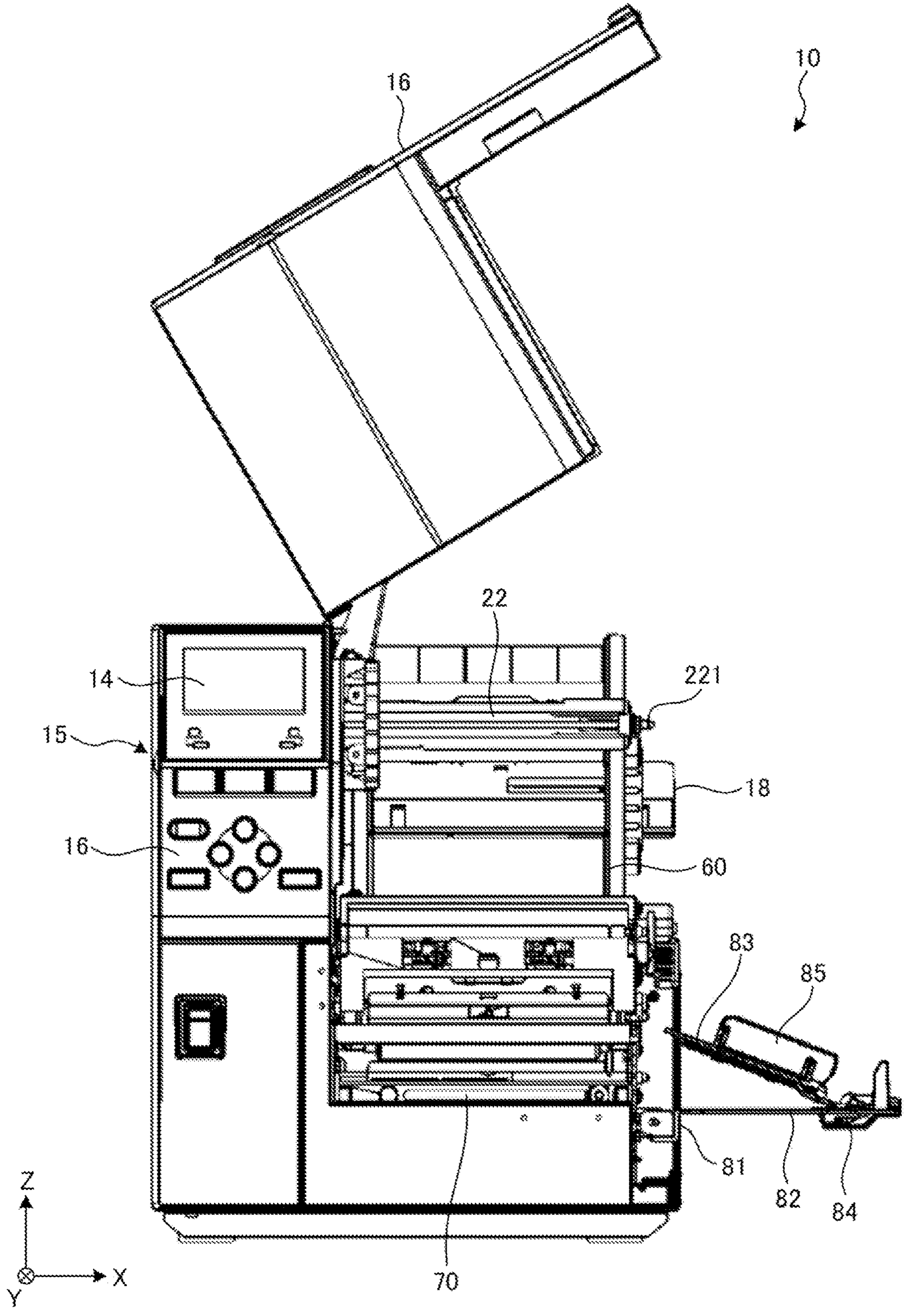
FIG. 4 is a front view schematically illustrating the printer in which the cover is opened.
Figure 5:
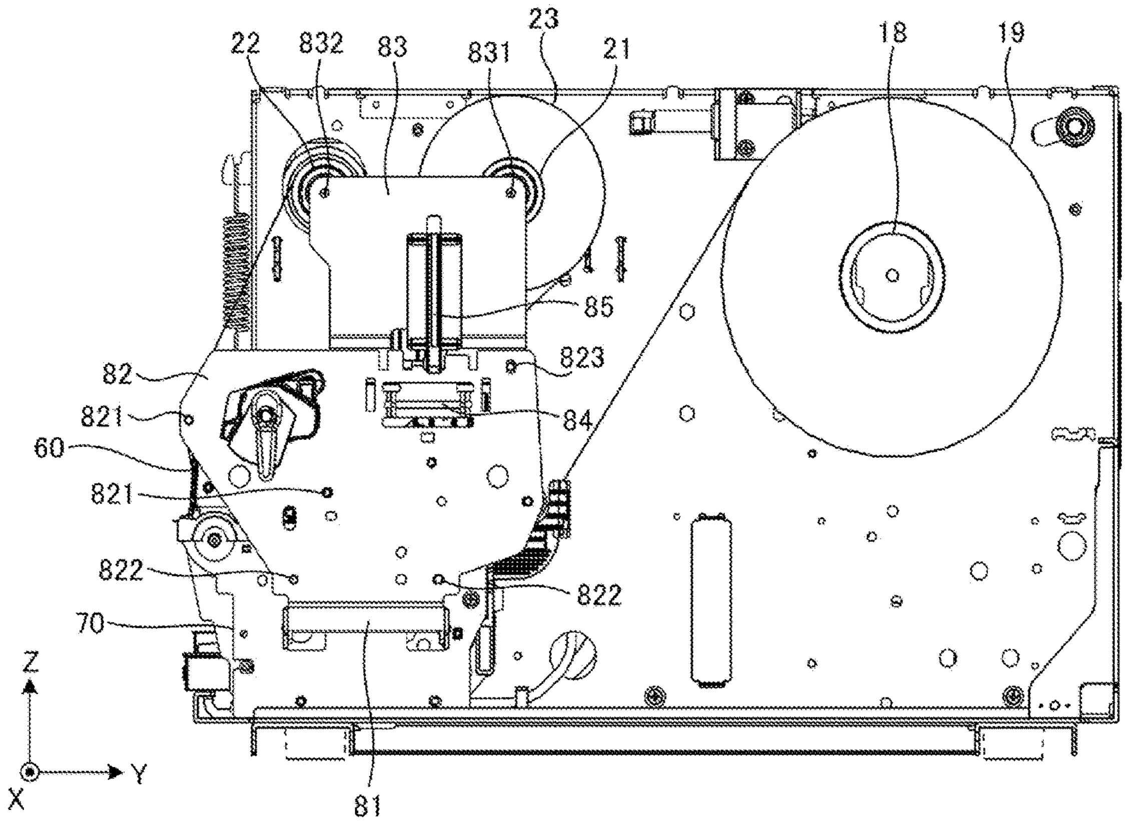
FIG. 5 is a diagram schematically illustrating an internal structure of the printer.
Figure 6:
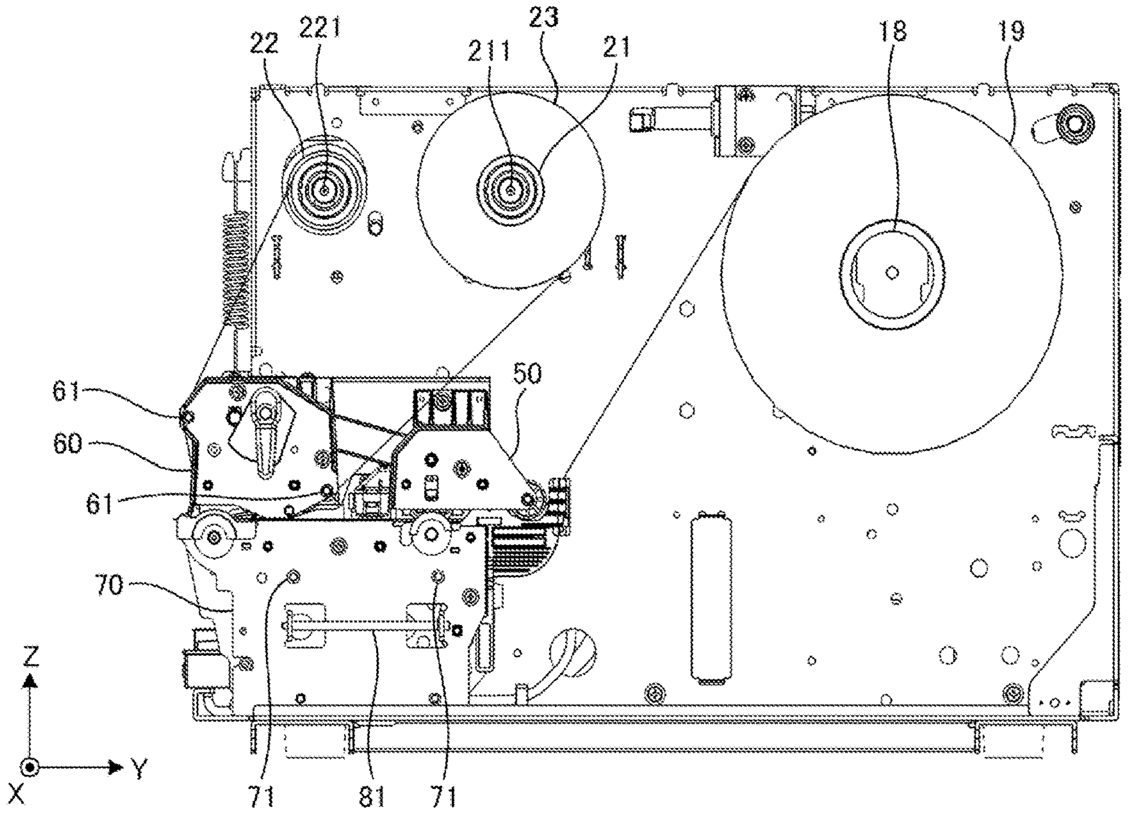
FIG. 6 is a diagram schematically illustrating an internal structure of the printer.

FIG. 1 is a perspective view schematically illustrating an external appearance of a printer 10 according to an embodiment. FIG. 2 is a perspective view schematically illustrating the printer 10 in which a cover is opened. FIG. 3 is a perspective view schematically illustrating the printer 10 in which the cover and a holding side plate are opened. FIG. 4 is a front view schematically illustrating the printer 10 in which the cover is opened. FIG. 5 and FIG. 6 are diagrams schematically illustrating an internal structure of the printer 10 according to the present embodiment. In the present embodiment, a width direction, a depth direction, and a height direction of the printer 10 are represented by three axes (X,Y,Z) perpendicular to each other.

The printer 10 stores a sheet wound in a roll form as a print medium. For example, the printer 10 performs printing on a label temporarily attached to a roll-type base (hereinafter, also referred to as label roll sheet 19).

A discharge port 12 through which a printed label is discharged is formed on a front surface of a main body housing 11 of the printer 10. On the left side of the main body housing 11, a control box 15 including an input unit 13 including various operation keys is provided, and on its front surface, a display device 14, and the like is provided. In the control box 15, a control unit for driving and controlling each component included in the printer 10 is provided.

A cover 16 for closing the internal opening of the main body housing 11 is provided above the main body housing 11. The cover 16 is rotatably provided in the upward direction around a hinge 17 provided on the control box 15 side on the upper surface of the main body housing 11.

A label supply shaft 18 for holding the label roll sheet 19 is provided inside the main body housing 11 of the printer 10. The label supply shaft 18 rotatably holds the label roll sheet 19. The label roll sheet 19 includes a base and a peelable label attached thereto.

Further, a ribbon supply shaft 21 and a ribbon take-up shaft 22, which are also referred to as ink ribbon shafts for holding an ink ribbon 23, are provided inside the main body housing 11 of the printer 10. One end of each of the ribbon supply shaft 21 and the ribbon take-up shaft 22 has a cantilevered structure and are held by a wall surface of the main body housing 11 on the control box 15 side, and the other end is a free end, i.e., not held by the main body housing 11.

On the free end side of the ribbon supply shaft 21, a positioning pin 211 is provided as an engaging portion to be fitted into a positioning hole 831 of an upper plate 83 described later. Further, a positioning pin 221 is provided on the free end side of the ribbon take-up shaft 22 as an engaging portion to be fitted into a positioning hole 832 of the upper plate 83 described later.

As shown in FIGS. 5 and 6, the ink ribbon 23 is attached to the ribbon supply shaft 21 and the ribbon take-up shaft 22. The ribbon supply shaft 21 and the ribbon take-up shaft 22 are driven by a driving source such as a motor (not shown). The ribbon take-up shaft 22 is rotationally driven by a drive source to take up the ink ribbon 23 conveyed in the forward direction. The "forward direction" is a direction in which the label roll sheet 19 is conveyed by a pinch roller block 50 and a platen roller unit 70, that is, a direction from the upstream side (i.e., +Y direction) in the conveyance direction toward the downstream side (i.e., −Y direction) in the conveyance direction.

The pinch roller block 50, a print head unit 60, and the platen roller unit 70 are housed inside the main body housing 11. The pinch roller block 50 includes a pinch roller for conveying the label roll sheet 19, a drive source for rotationally driving the pinch roller, a drive train, and the like (none of which is shown).

The print head unit 60 is provided below the ribbon supply shaft 21 and the ribbon take-up shaft 22. The print head unit 60 includes a thermal head, a driving unit for driving the thermal head, a pressing mechanism for raising and lowering the thermal head, and the like (none of which is shown).

The platen roller unit 70 is provided below the print head unit 60 and fixed to the main body housing 11. The platen roller unit 70 forms a gap between the print head unit 60 and the ink ribbon 23 for inserting and conveying the label roll sheet 19. The platen roller unit 70 includes a platen roller, a drive source for rotationally driving the platen roller, a drive train, and the like (none of which is shown).

When printing is performed on the label roll sheet 19, the printer 10 presses the thermal head against the platen roller in a state where the label roll sheet 19 and the ink ribbon 23 are interposed between the thermal head and the platen roller. Then, the printer 10 rotates the pinch roller and the platen roller to convey the label roll sheet 19 and the ink ribbon 23 from the upstream side in the conveyance direction to the downstream side in the conveyance direction. The printer 10 supplies a print signal to the thermal head while conveying the label roll sheet 19 and the ink ribbon 23. As a result, the heating element of the thermal head generates heat, and printing is performed on the label of the label roll sheet 19. The printer 10 discharges the printed label from the discharge port 12 to the outside.

The pinch roller block 50 has a cantilevered structure held by a rotation shaft (not shown) provided on a wall surface of the control box 15. Further, the print head unit 60 has a cantilever structure held by a rotation shaft (not shown) provided on the wall surface of the control box 15 side.

On the side surface of the print head unit 60 on the free end side, one or more positioning pins 61 are provided as engagement portions to be fitted into positioning holes 821 of a lower plate 82 to be described later. Further, one or more positioning pins 71 are provided on the side surface of the platen roller unit 70 as engagement portions to be fitted into a positioning holes 822 of the lower plate 82, which will be described later.

The free ends of the ribbon supply shaft 21, the ribbon take-up shaft 22, and the print head unit 60 are connectable to the main body housing 11 (i.e., the platen roller unit 70) by a plate-shaped holding side plate 80 that can be opened and closed by a first hinge portion 81. Specifically, various positioning pins on the free ends of the ribbon supply shaft 21, the ribbon take-up shaft 22, and the print head unit 60, which will be described later, are connected to the platen roller unit 70 via the holding side plate 80 by being fitted into the positioning holes of the holding side plate 80. FIG. 2 and FIG. 5 show a state of the printer 10 in which the holding side plate 80 is closed. In addition, FIG. 3 and FIG. 6 show a state of the printer 10 in which the holding side plate 80 is opened (hereinafter, also referred to as an open state).

The holding side plate 80 has a lower end portion connected to the platen roller unit 70 by the first hinge portion 81. Further, the first hinge portion 81 holds the holding side plate 80 so as to be rotatable in a direction in which the holding side plate 80 is brought into contact with and separated from the free ends of the ribbon supply shaft 21, the ribbon take-up shaft 22, and the print head unit 60, thereby realizing a closed state in which those free ends are connected to and supported by the platen roller unit 70 and an open state in which the connection is released.

Further, the holding side plate 80 has the lower plate 82 and the upper plate 83 which are separated along a line perpendicular to the height direction of the main body housing 11. The holding side place 80 is foldable along that line such that the lower plate 82 and the upper place 83 are stacked.

Specifically, the lower end side of the lower plate 82 is connected to the platen roller unit 70 via the first hinge portion 81. The lower plate 82 is rotatable around the first hinge portion 81 in the width direction outer side (i.e., +X direction) of the main body housing 11. A second hinge portion 84 is provided on the upper end side of the lower plate 82. The lower end side of the upper plate 83 is connected to the lower plate 82 via the second hinge portion 84. The upper plate 83 is rotatable in the widthwise direction (i.e., −X direction) of the main body housing 11 around the second hinge portion 84. That is, the holding side plate 80 is foldable by rotating the upper plate 83 toward the control box 15 side by the second hinge portion 84.

Further, the lower plate 82 and the upper plate 83 are configured such that the outer surface thereof is flush with each other in a state of being erected in the height direction of the printer 10 (see FIG. 2). Here, the "outer surface" of the lower plate 82 and the upper plate 83 means a surface located outside the printer 10 (i.e., in +X direction) with the lower plate 82 and the upper plate 83 standing in the height direction of the printer 10. In addition, the "inner surface" of the lower plate 82 and the upper plate 83 means a surface located inside the printer 10 (i.e., in −X direction) with the lower plate 82 and the upper plate 83 standing in the height direction of the printer 10. A handle portion 85 serving as a handle for opening and closing the holding side plate 80 is provided on the outer surface of the upper plate 83.

When the holding side plate 80 is opened, the user turns the upper plate 83 inward in the width direction of the main body housing 11 while rotating the lower plate 82 outward in the width direction of the main body housing 11 (see arrows A and B in FIG. 3). Thus, the holding side plate 80 is in a folded state in which the lower plate 82 and the upper plate 83 are stacked. Note that FIGS. 2 and 5 show the holding side plate 80 in the closed state, and FIGS. 3, 4, and 6 show the holding side plate 80 in the open state.

Referring now to FIG. 4, it can be seen that the amount of protrusion from the main body housing 11 in the state in which the holding side plate 80 is opened is within the size of the lower plate 82 in X direction. Therefore, for example, compared with a configuration in which the holding side plate 80 is a single flat plate, in the printer 10 of the present embodiment, it is possible to suppress the amount of protruding from the main body housing 11 in a state where the holding side plate 80 is opened. That is, in the printer 10 of the present embodiment, it is possible to suppress the occupied area when the holding side plate 80 is opened.

Figure 7:
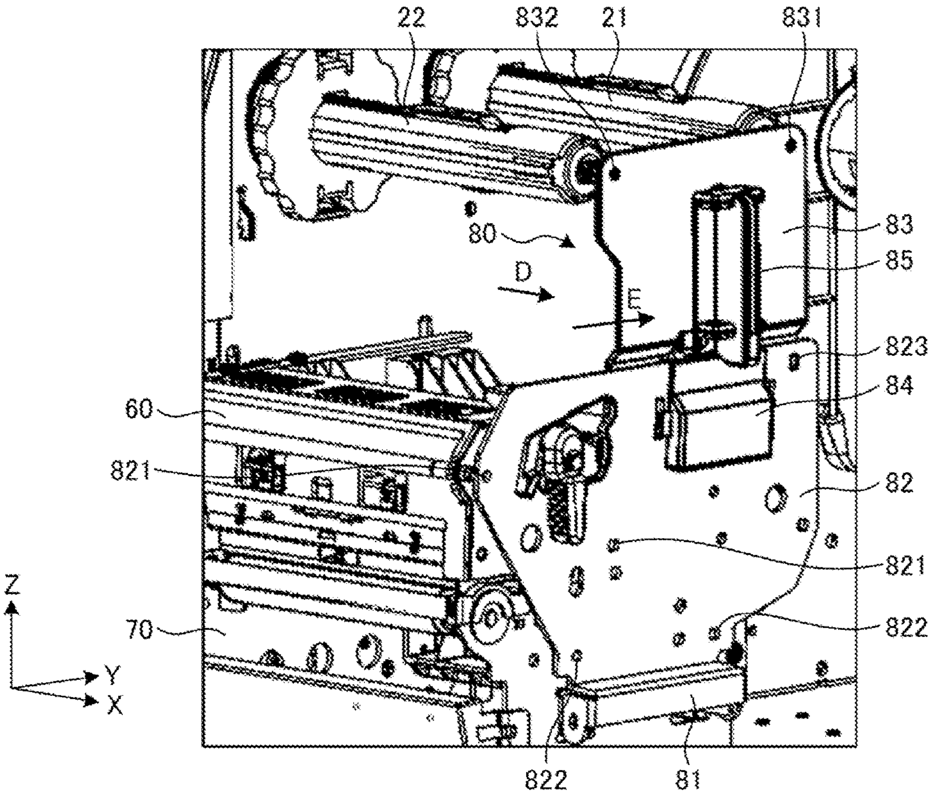
FIG. 7 is a partially enlarged view of the periphery of the holding side plate shown in FIG. 2.
Figure 8:
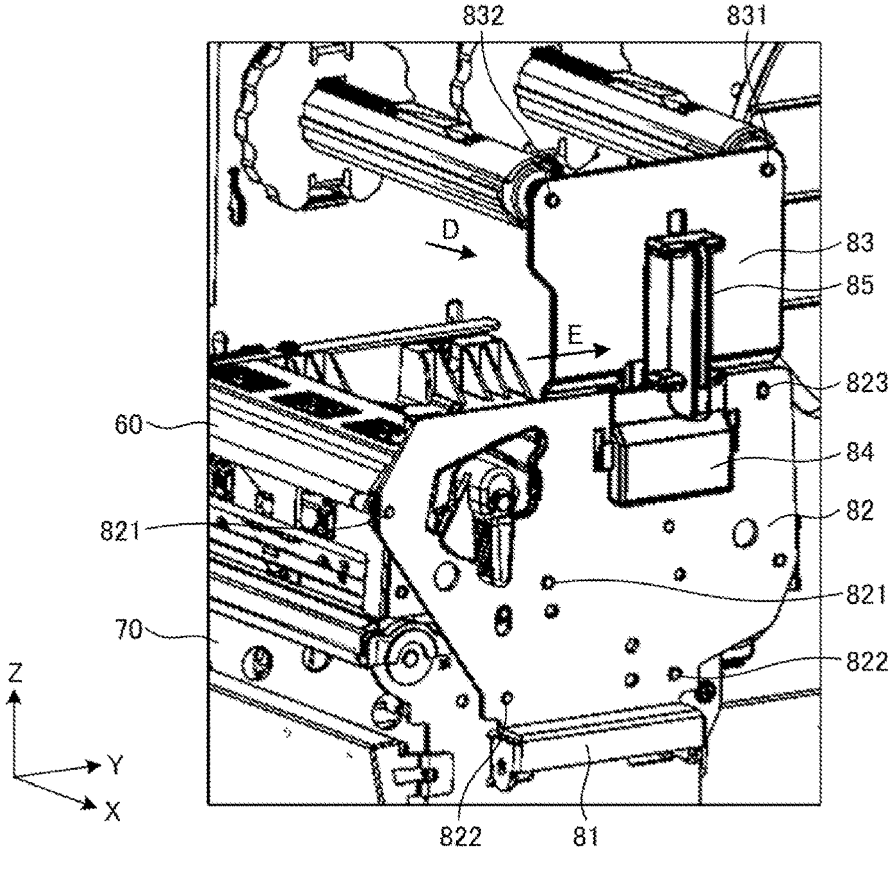
FIG. 8 is a partially enlarged view of the periphery of the holding side plate shown in FIG. 2.

Next, the configuration of the holding side plate 80 will be described. FIGS. 7 and 8 are partial enlarged views of the periphery of the holding side plate 80 shown in FIG. 2.

As shown in FIGS. 7 and 8, the lower plate 82 has one or more positioning holes 821 into which one or more positioning pins 61 provided in the print head unit 60 fit. Further, the lower plate 82 has one or more positioning holes 822 into which one or more positioning pins 71 provided in the platen roller unit 70 fit. Further, the lower plate 82 has a positioning hole 823 into which a positioning pin 833 (see FIGS. 14 and 15) provided on the outer surface of the upper plate 83 fits.

On the other hand, the upper plate 83 has positioning holes 831 and 832 into which the positioning pins 211 and 221 provided at the ends of the ribbon supply shaft 21 and the ribbon take-up shaft 22 fit.

The positioning holes of the lower plate 82 and the upper plate 83 are provided to face the corresponding positioning pins of the ribbon supply shaft 21, the ribbon take-up shaft 22, the print head unit 60, and the platen roller unit 70 in a state where the holding side plate 80 is closed.

More specifically, the free ends of the ribbon supply shaft 21, the ribbon take-up shaft 22, and the print head unit 60 are held at proper positions with respect to the platen roller unit 70 through the positioning holes of the lower plate 82 and the upper place 82. In a state in which the holding side plate 80 is closed, the various positioning pins fit into and engage with the corresponding positioning holes. Thus, the holding side plate 80 can support the free end of each of the ribbon supply shaft 21, the ribbon take-up shaft 22, and the print head unit 60 with respect to the platen roller unit 70. The holding side plate 80 may be connected to the pinch roller block 50 in the same manner as the print head unit 60.

The handle portion 85 provided on the outer surface of the upper plate 83 is configured to be slidable in a direction in which the handle portion comes into contact with the lower plate 82. In the following description, in a state in which the lower plate 82 and the upper plate 83 are erected, the sliding direction away from the lower plate 82 is also referred to as the "upper" direction, and the sliding direction approaching the lower plate 82 is also referred to as the "lower" direction.

Further, the handle portion 85 is connected to a shutter portion 87 (see FIGS. 9 and 10) provided on the inner surface side of the upper plate 83 via a slit provided in the upper plate 83. The shutter portion 87 moves up and down in accordance with the vertical sliding operation of the handle portion 85. FIG. 7 shows the handle portion 85 that is slid upward. FIG. 8 shows the handle portion 85 that is slid downward.

Figure 9:
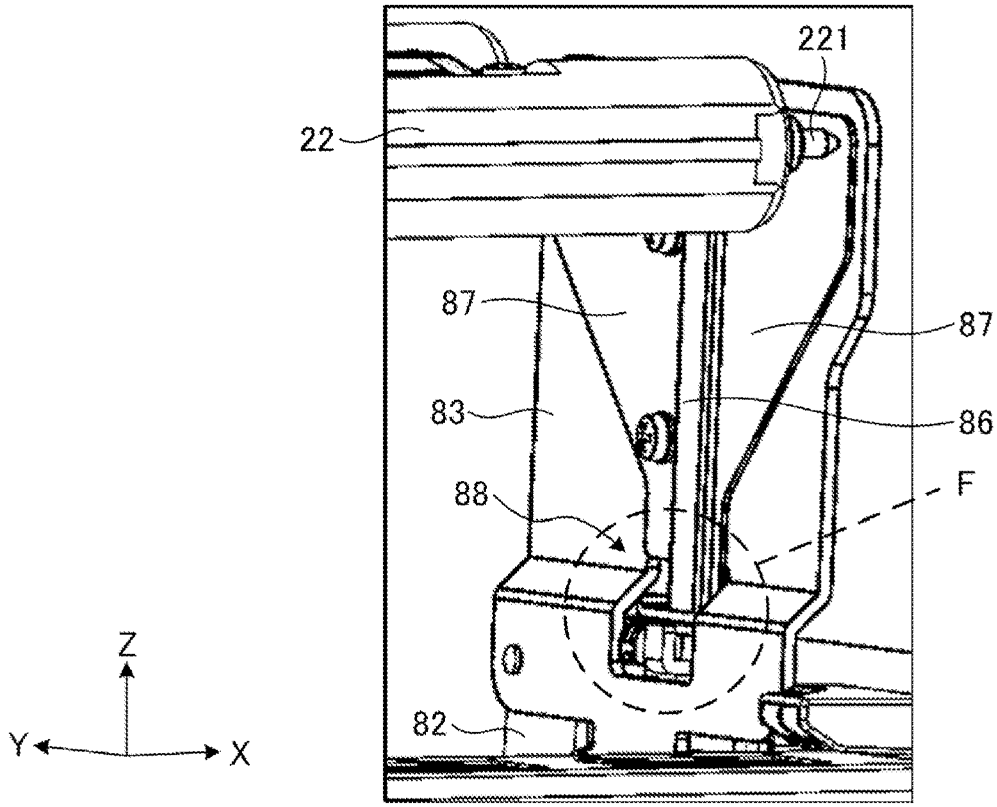
FIG. 9 is a perspective view of an upper plate shown in FIG. 7 as viewed from the D direction.
Figure 10:
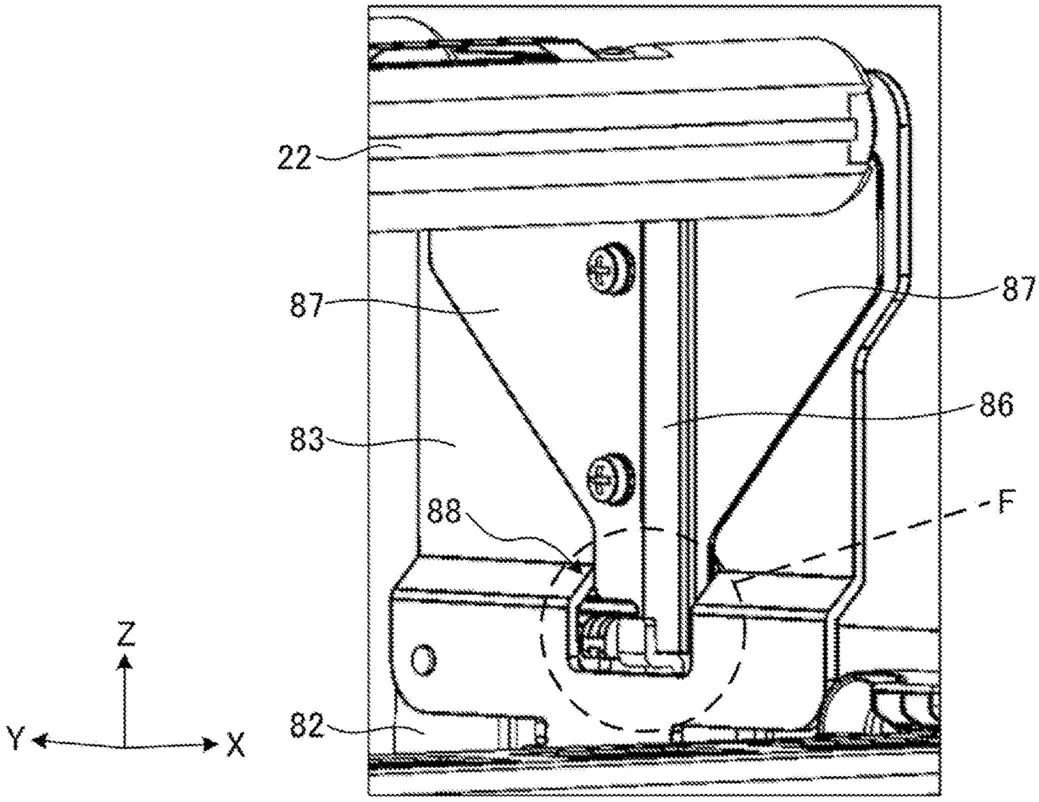
FIG. 10 is a perspective view of the upper plate shown in FIG. 8 as viewed from the D direction.

Here, FIG. 9 is a perspective view of the upper plate 83 shown in FIG. 7 viewed from the D direction. FIG. 10 is a perspective view of the upper plate 83 shown in FIG. 8 viewed from the D direction.

As shown in FIGS. 9 and 10, a lock arm 86 and the shutter portion 87 are provided on the inner surface side of the upper plate 83. The lock arm 86 is a columnar rigid body and is integrally provided with the shutter portion 87.

The shutter portion 87 is a plate-shaped member provided along the inner wall surface of the upper plate 83. The shutter portion 87 is joined to the handle portion 85 by a joining member such as a screw, and moves in the up-down direction in conjunction with the sliding operation of the handle portion 85. The shutter portion 87 closes the positioning holes 831 and 832 in the upper plate 83, in a state where the handle portion 85 is slid upward. The shutter portion 87 opens the positioning holes 831 and 832 in a state where the handle portion 85 is slid downward.

Further, the lock arm 86 moves in the up-down direction integrally with the shutter portion 87 in conjunction with the sliding operation of the handle portion 85. The lock arm 86 is configured such that the distal end portion (i.e., the lower end portion) of the lock arm 86 reaches and fits into the fitting portion 88 of the lower plate 82 in a state where the handle portion 85 is lowered. The lock arm 86, the shutter portion 87, and the fitting portion 88 make up a lock mechanism.

Figure 11:
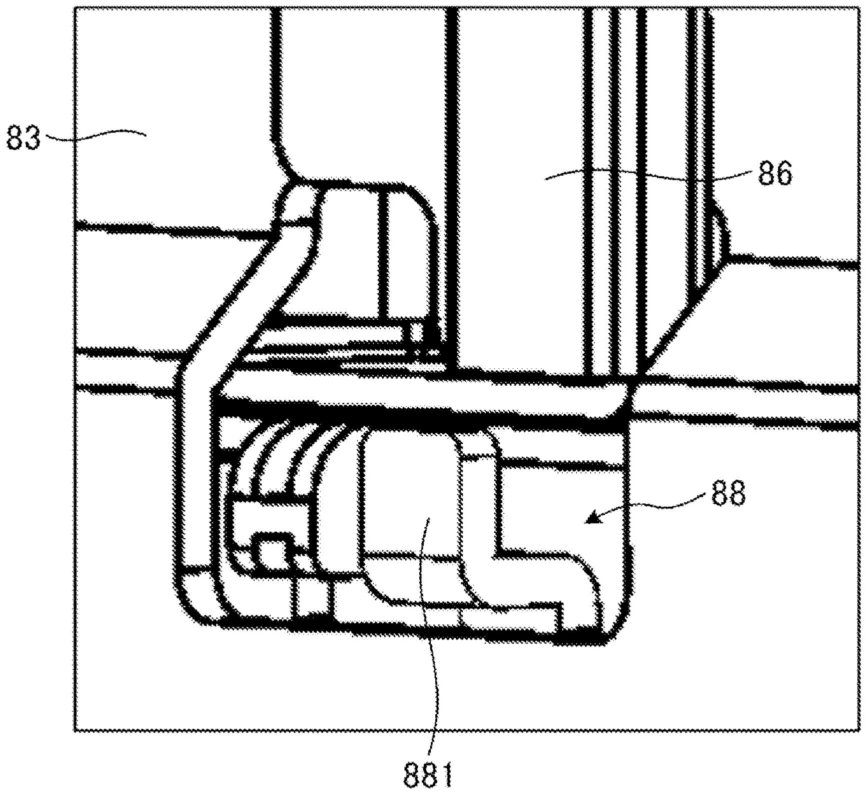
FIG. 11 is a partially enlarged view of the periphery of a fitting portion shown in FIG. 9.
Figure 12:
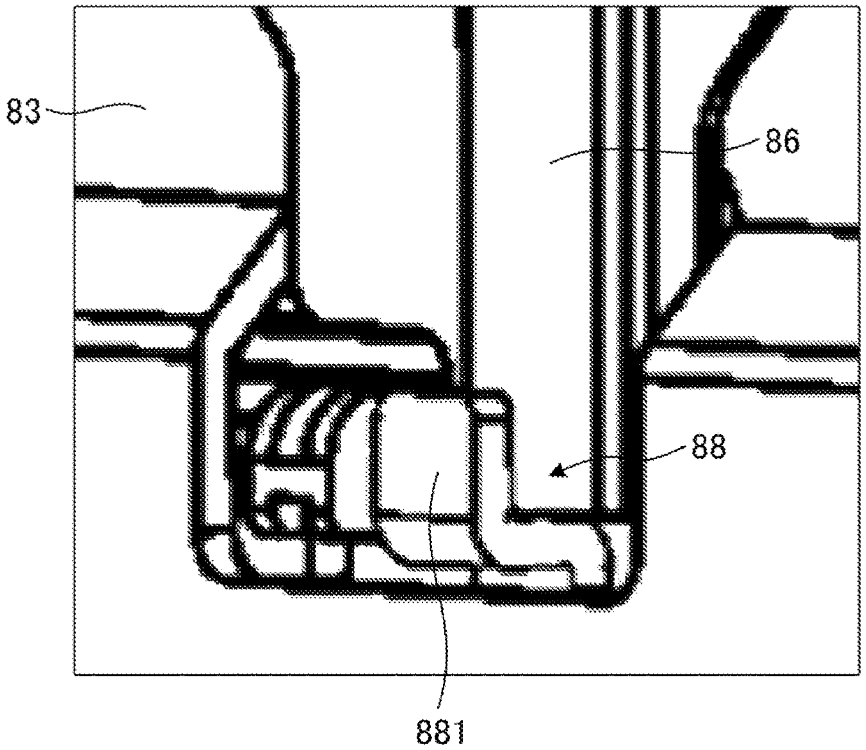
FIG. 12 is a partially enlarged view of the periphery of the fitting portion shown in FIG. 10.

The fitting portion 88 is provided at the upper end portion on the inner surface side of the lower plate 82, and into which the distal end portion of the lock arm 86 fits in a state where the handle portion 85 is lowered. FIG. 11 is a partially enlarged view of the periphery (i.e., the broken line area F) of the fitting portion 88 shown in FIG. 9. FIG. 12 is a partially enlarged view of the periphery (i.e., the dashed line area F) of the fitting portion 88 shown in FIG. 10.

As shown in FIG. 11, the fitting portion 88 includes a fitted member 881 that forms a recess into which the lock arm 86 fits. When the lock arm 86 is moved upward, the lock arm 86 does not fit into the fitted member 881 and is separated from the lower plate 82. That is, the holding side plate 80 can be folded such that the lower plate 82 and the upper plate 83 are stacked in a state in which the handle portion 85 is pulled upward. On the other hand, as shown in FIG. 12, the lock arm 86 is moved downward so that its distal end fits into the recess formed by the fitted member 881.

That is, when the handle portion 85 is pulled downward, the holding side plate 80 is in a locked state in which the lower plate 82 and the upper plate 83 are flush. Further, when the handle portion 85 is pulled upward, the holding side plate 80 is unlocked, and the lower plate 82 and the upper plate 83 are unlocked so as to be foldable.

The lower end portion 851 of the handle portion 85 is configured to overlap the outer surface of the lower plate 82 during the downward sliding operation. Here, FIG. 13 is an arrow view of the periphery of the lower end portion of the handle portion 85 shown in FIGS. 7 and 8 as viewed from the E direction.

Figure 13:
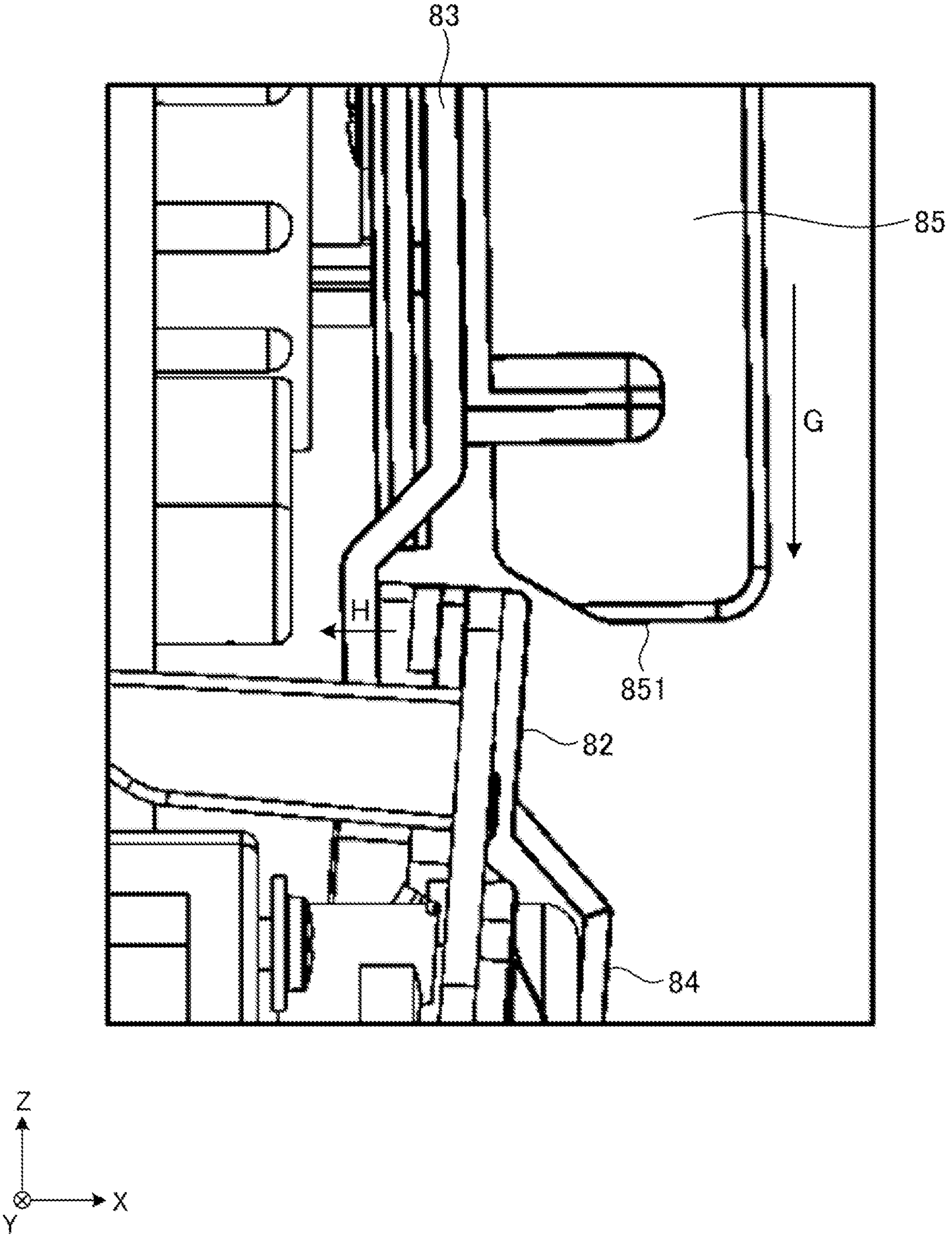
FIG. 13 is an arrow view of the periphery of a lower end portion of a handle portion shown in FIGS. 7 and 8 as viewed from the E direction.

As shown in FIG. 13, a corner portion of the lower end portion 851 of the handle portion 85 is chamfered, and is formed in a tapered shape as a whole. More specifically, the corner portion of the lower end portion 851 of the handle portion 85 facing the outer surface of the upper plate 83 is formed in an inclined surface shape.

When the handle portion 85 is pushed down in the G direction, the inclined surface formed at the lower end portion 851 of the handle portion 85 and the upper end portion of the lower plate 82 come into contact with each other. In addition, with the movement of the handle portion 85 in the G direction, the upper end portion of the lower plate 82 slides along the inclined surface of the lower end portion 851 to move in the H direction. With such a configuration, in the holding side plate 80, by pushing down the handle portion 85 in the G direction, a force that makes the lower plate 82 and the upper plate 83 flush with each other acts.

In the holding side plate 80 having the above-described configuration, when the holding side plate 80 in the open state is closed, the user performs an operation of raising the lower plate 82 and the upper plate 83 in the height direction of the printer 10 in a state where the handle portion 85 is slid upward.

At this time, the lower plate 82 and the upper plate 83 are brought into contact with the ribbon supply shaft 21 and the ribbon take-up shaft 22 in a state of being bent in a slightly "dogleg" shape. In this state, when the positioning pins 211 and 221 and the positioning holes 831 and 832 provided in the upper plate 83 come into contact with each other, galling may occur at the tips of the positioning pins 211 and 221, and there is a possibility that a fitting failure in which the upper plate 83 does not reach the normal position may occur. However, in the printer 10 of the present embodiment, as described above, in a state in which the handle portion 85 is slid upward, the shutter portion 87 integrated with the lock arm 86 is configured to close the positioning holes 831 and 832. Therefore, in the holding side plate 80 of the present embodiment, when the lower plate 82 and the upper plate 83 are not flush with each other, the shutter portion 87 closes the positioning holes 831 and 832, so that it is possible to prevent the fitting failure.

Further, when the user slides the handle portion 85 downward in a state where the positioning pins 211 and 221 are in contact with the shutter portion 87, a force that makes the lower plate 82 and the upper plate 83 flush with each other acts due to the tapered shape at the lower end portion 851 of the handle portion 85. Further, as the handle portion 85 slides downward, the shutter portion 87 opens the positioning holes 831 and 832. Accordingly, each of the positioning pins including the positioning pins 211 and 221 is connected to the upper plate 83 at an appropriate position, and the distal end portion of the lock arm 86 fits into the fitting portion 88, whereby the lower plate 82 and the upper plate 83 are locked. As a result, the holding side plate 80 covers the free end of each of the positioning pins 211 and 221 and the print head unit 60 while maintaining the position thereof with respect to the platen roller unit 70.

When the holding side plate 80 in the closed state is opened, the user slides the handle portion 85 upward to unlock the lower plate 82 and the upper plate 83 and to disengage the various positioning pins from the corresponding positioning holes. Then, the user performs an operation of folding the lower plate 82 and the upper plate 83 to maintain the open state of the holding side plate 80.

With the above configuration, the area occupied by the printer 10 at the time of opening the holding side plate 80 is suppressed. In addition, the printer 10 can improve operability related to opening and closing of the holding side plate 80, and can reliably maintain the positions of the ribbon supply shaft 21, the ribbon take-up shaft 22, and the print head unit 60. Specifically, the user can perform the opening and closing operation with one hand by grasping the handle portion 85, and thus the operability can be improved.

As described above, the lock arm 86 provided on the upper plate 83 fits into the fitting portion 88 of the lower plate 82 with the handle portion 85 lowered. Therefore, for example, when the upper plate 83 is raised in a state in which the handle portion 85 is lowered by folding the lower plate 82 and the upper plate 83 (see FIG. 3), the lock arm 86 and the fitting portion 88 (the fitted member 881) interfere with each other, and there is a possibility that a defect such as breakage may occur.

Therefore, the holding side plate 80 of the present embodiment has a structure for preventing interference between the lock arm 86 and the fitting portion 88 described above. Hereinafter, such a structure for preventing interference between the lock arm 86 and the fitting portion 88 included in the holding side plate 80 will be described with reference to FIGS. 14 to 16.

Figure 14:
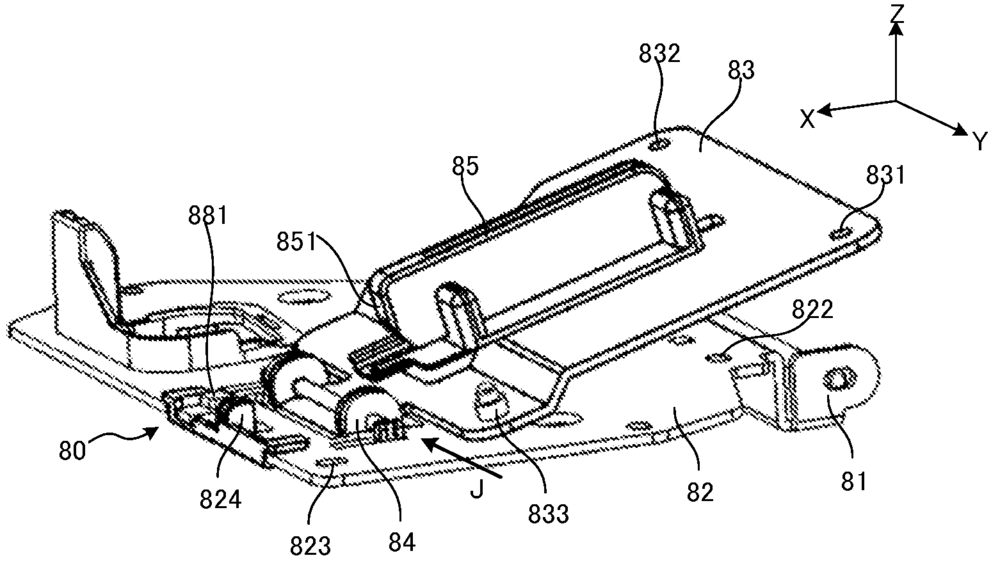
FIG. 14 is a perspective view of the holding side plate shown in FIG. 3 as viewed from the C direction.
Figure 15:
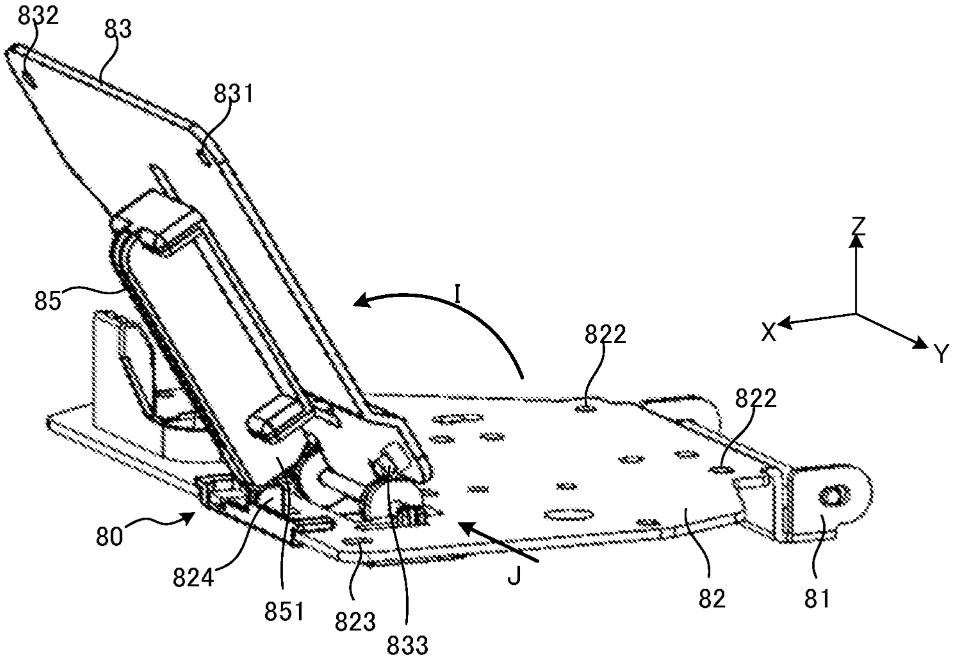
FIG. 15 is a perspective view of the holding side plate shown in FIG. 3 as viewed from the C direction.

FIG. 14 and FIG. 15 are perspective views of the holding side plate 80 shown in FIG. 3 as viewed from the C direction. Here, FIG. 14 shows the lower plate 82 and the upper plate 83 that are folded, and FIG. 15 shows the upper plate 83 expanded in the arrow I direction from the state of FIG. 14. Further, FIGS. 16A to 16C are arrow views of the holding side plate 80 shown in FIGS. 14 and 15 as viewed from the J direction.

As illustrated in FIGS. 14, 15, and 16, a convex guide portion 824 is provided at an upper end portion of the inner wall surface of the lower plate 82. The guide portion 824 has a chamfered curved surface shape and is provided at a position corresponding to the lower end portion 851 of the handle portion 85. Specifically, the guide portion 824 has a curved surface shape over the height direction of the lower plate 82.

Figure 16A:
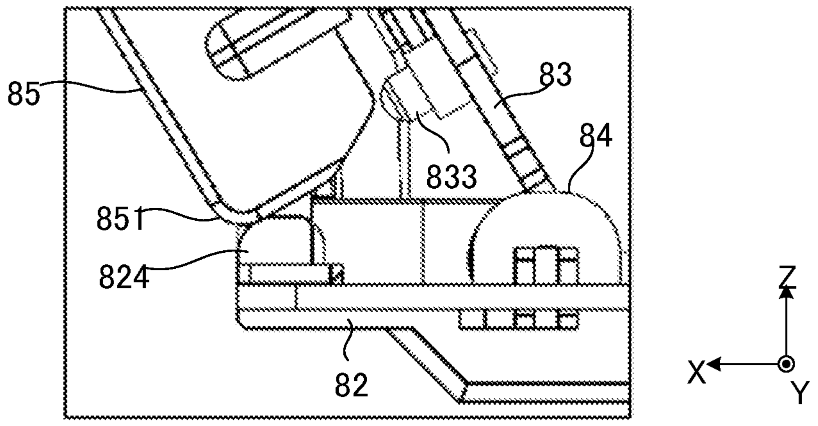
FIGS. 16A to 16C are arrow views of the holding side plate shown in FIGS. 14 and 15 as viewed from the J direction.
Figure 16B:
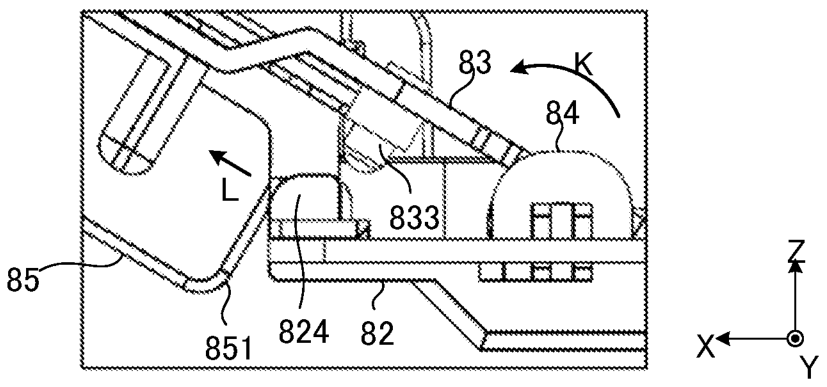
Figure 16C:
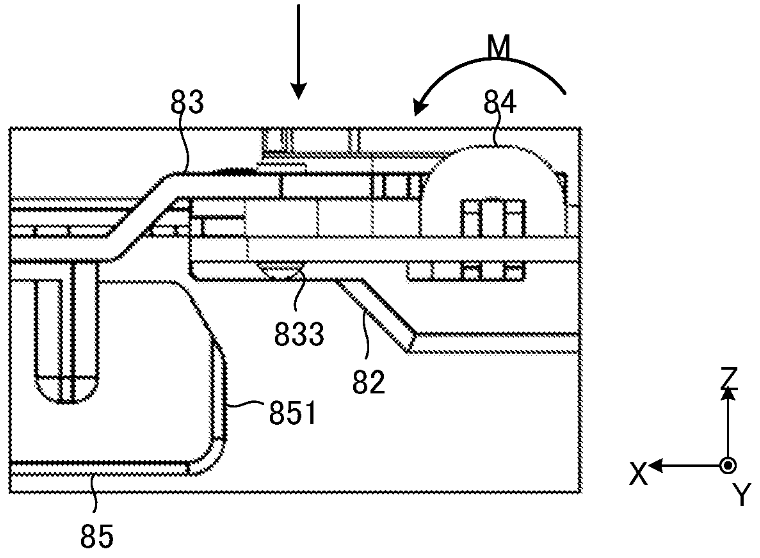

When the upper plate 83 rises in the I direction in FIG. 15, the lower end portion 851 of the handle portion 85 of the upper plate 83 abuts against the guide portion 824, as shown in FIG. 16A. Further, the lower end portion 851 of the handle portion 85 slides along the guide portion 824, and accordingly, the handle portion 85 moves toward the L direction in the drawing, whereby the handle portion 85 is pushed up. Then, as shown in FIG. 16C, when the upper plate 83 is moved in the M direction, the positioning pins 833 of the upper plate 83 are fitted into the positioning holes 823 provided in the lower plate 82, and the lower plate 82 and the upper plate 83 are unfolded.

With the above-described configuration, even if the upper plate 83 is raised in a state in which the handle portion 85 is lowered by folding the lower plate 82 and the upper plate 83, the handle portion 85 is automatically pushed up, so that interference between the lock arm 86 and the fitting portion 88 can be prevented. Thus, for example, even when the lower plate 82 and the upper plate 83 are unfolded by grasping a part thereof other than the handle portion 85, the lock arm 86 and the fitting portion 88 can be smoothly disengaged without interference.

As described above, in the printer 10 of the present embodiment, the free ends of the ribbon supply shaft 21, the ribbon take-up shaft 22, and the print head unit 60 are openable and closable by the holding side plate 80, and the holding side plate 80 is configured to be foldable in the open state of the holding side plate 80. Thus, in the printer 10, since it is possible to suppress the occupied area at the time of opening, it is possible to achieve convenience when opening the free ends for replacement or the like of the ink ribbon 23.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A printer comprising:

a housing;

an ink ribbon shaft connected to an inner surface of the housing at a first end of the ink ribbon shaft, extending along a first direction away from the inner surface of the housing from the first end to a second end, and by which an ink ribbon is held;

a print head connected to the inner surface of the housing at a first end of the print head, extending along the first direction from the first end to a second end, and configured to transfer ink from the ink ribbon to a sheet;

a platen roller connected to the inner surface of the housing at a first end of the platen roller, extending along the first direction from the first end to a second end, and facing the print head to convey the sheet; and a holding plate connected to the second end of the platen roller to be rotatable around a first hinge, and by which the second end of each of the ink ribbon shaft and the print head is held when the holding plate is rotated about the first hinge to be parallel to the inner surface of the housing, wherein the holding plate includes a second hinge about which the holding plate is foldable.

2. The printer according to claim 1, wherein the holding plate includes an upper plate and a lower plate, and the upper plate is rotatable about the second hinge and stackable on the lower plate.

3. The printer according to claim 2, wherein the ink ribbon shaft includes a protrusion at the second end thereof, and the upper plate has a hole into which the protrusion fits.

4. The printer according to claim 2, wherein the print head includes a protrusion at the second end thereof, and the lower plate has a hole into which the protrusion fits.

5. The printer according to claim 2, further comprising:

a handle attached to the upper plate and slidable along the upper plate to contact the lower plate; and a lock mechanism configured to maintain the holding plate in an unfolded state in which the upper and lower plates are on a same plane when the handle contacts the lower plate.

6. The printer according to claim 5, wherein a lower end portion of the handle includes an inclined surface that pushes an upper end of the lower plate such that the upper and lower plates are on the same plane when the handle is slid toward the lower plate.

7. The printer according to claim 6, wherein the lower plate includes a guide portion having a curved surface along which the lower end portion of the handle moves when the upper plate is rotated.

8. The printer according to claim 1, further comprising:

a cover by which the ink ribbon shaft, the print head, the platen roller, and the holding plate are covered, wherein the cover is rotatable about a third hinge parallel to the first hinge.

9. The printer according to claim 1, wherein the print head is disposed below the ink ribbon shaft.

10. The printer according to claim 9, wherein the print head is directly above the platen roller.

11. A printer comprising:

a housing;

an ink ribbon shaft connected to an inner surface of the housing at a first end of the ink ribbon shaft, extending along a first direction away from the inner surface of the housing from the first end to a second end, and by which an ink ribbon is held;

a print head connected to the inner surface of the housing at a first end of the print head, extending along the first direction from the first end to a second end, and configured to transfer ink from the ink ribbon to a sheet;

a platen roller connected to the inner surface of the housing at a first end of the platen roller, extending along the first direction from the first end to a second end, and facing the print head to convey the sheet; and a holding plate including:

a lower plate connected to the second end of the platen roller to be rotatable around a first hinge and by which the second end of the print head is held when the lower plate is rotated about the first hinge to be parallel to the inner surface of the housing, a second hinge, and an upper plate connected to the lower plate to be rotatable around the second hinge and by which the second end of the ink ribbon shaft is held when the upper plate is rotated about the second hinge to be parallel to the inner surface of the housing.

12. The printer according to claim 11, wherein the upper plate is stackable on the lower plate.

13. The printer according to claim 12, wherein the ink ribbon shaft includes a protrusion at the second end thereof, and the upper plate has a hole into which the protrusion fits.

14. The printer according to claim 12, wherein the print head includes a protrusion at the second end thereof, and the lower plate has a hole into which the protrusion fits.

15. The printer according to claim 12, further comprising:

a handle attached to the upper plate and slidable along the upper plate to contact the lower plate; and a lock mechanism configured to maintain the holding plate in a state in which the upper and lower plates are on a same plane when the handle contacts the lower plate.

16. The printer according to claim 15, wherein a lower end portion of the handle includes an inclined surface that pushes an upper end of the lower plate such that the upper and lower plates are on the same plane when the handle is slid toward the lower plate.

17. The printer according to claim 16, wherein the lower plate includes a guide portion having a curved surface along which the lower end portion of the handle moves when the upper plate is rotated.

18. The printer according to claim 11, further comprising:

a cover by which the ink ribbon shaft, the print head, the platen roller, and the holding plate are covered, wherein the cover is rotatable about a third hinge parallel to the first hinge.

19. The printer according to claim 11, wherein the print head is disposed below the ink ribbon shaft.

20. The printer according to claim 19, wherein the print head is directly above the platen roller.

* * * * *